United States Patent [19]

Herman et al.

[11] 4,133,212

[45] Jan. 9, 1979

[54] PARABOLIC FOCUSSING THERMAL DETECTOR FOR LOW LEVEL ULTRASONIC POWER MEASUREMENTS

[75] Inventors: Bruce A. Herman; Harold F. Stewart, both of Rockville, Md.

[73] Assignee: The United States of America as represented by the Secretary of the Department of Health, Education & Welfare, Washington, D.C.

[21] Appl. No.: 847,022

[22] Filed: Oct. 31, 1977

[51] Int. Cl.$^2$ .............................................. G01H 3/12
[52] U.S. Cl. ................................................... 73/647
[58] Field of Search ..................... 73/1 DV, 646, 647; 340/5 C, 8 FT

[56] References Cited

U.S. PATENT DOCUMENTS

| | | | |
|---|---|---|---|
| 2,398,117 | 4/1946 | Rost et al. | 340/8 FT |
| 3,832,889 | 9/1974 | Bauer | 73/642 |

FOREIGN PATENT DOCUMENTS 154418   10/1963   U.S.S.R. ................................. 73/1 DV

Primary Examiner—Richard C. Queisser
Assistant Examiner—John P. Beauchamp
Attorney, Agent, or Firm—Browdy and Neimark

[57] ABSTRACT

A system and technique for determining the total radiated ultrasonic power output from a diagnostic ultrasound device having an output transducer includes a water chamber having a parabolic reflector. The transducer is mounted on the chamber at a location so that acoustic power from the transducer is focussed by the parabolic reflector to a first thermistor chip mounted in the chamber on a sound-absorbing rubber plate. The rise in temperature of the thermistor chip due to sound absorption changes its resistance. The thermistor chip is connected in one leg of a Wheatstone bridge. A reference thermistor chip is mounted on the rubber plate away from the ultrasonic beam and is connected in an opposite leg of the bridge. Starting from a null setting of the bridge, the output of the bridge after a suitable "response time" is in accordance with the acoustic energy delivered by the transducer.

11 Claims, 1 Drawing Figure

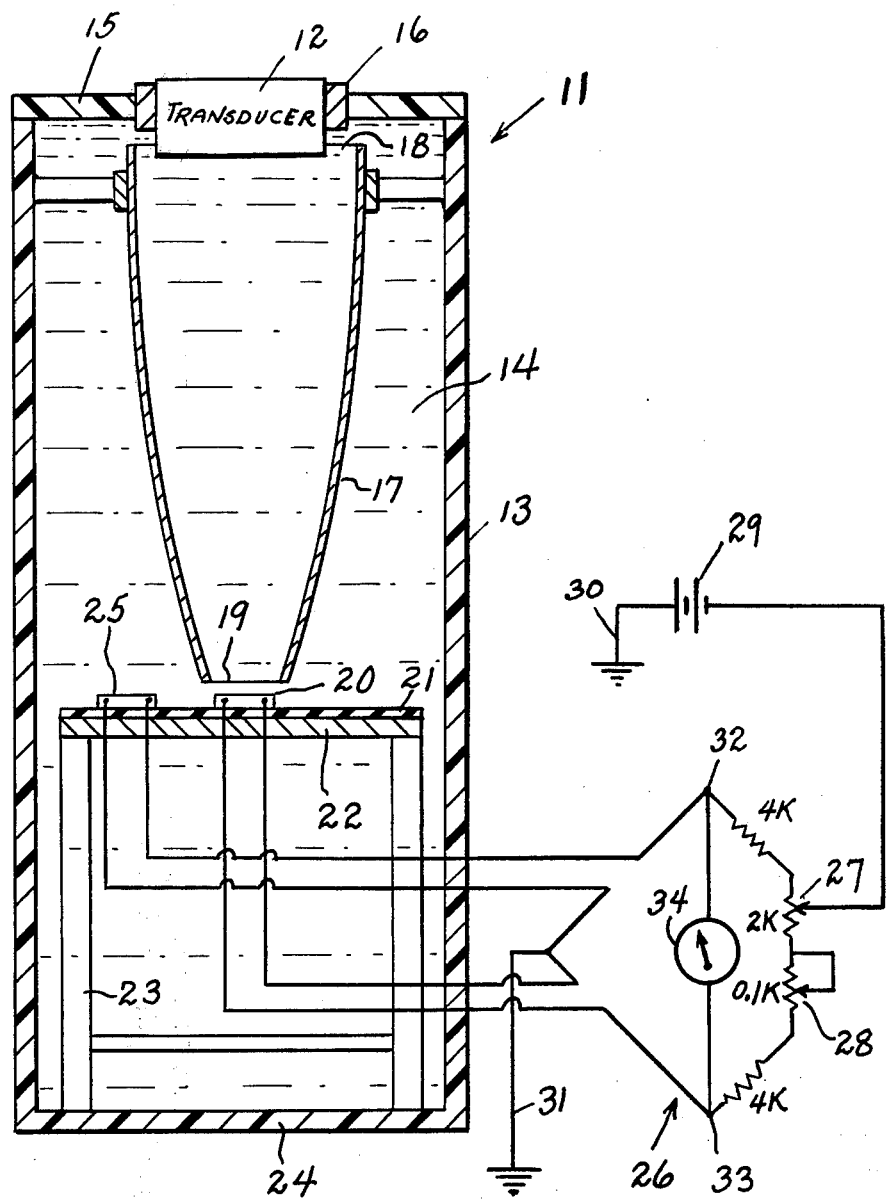

PARABOLIC FOCUSSING THERMAL DETECTOR FOR LOW LEVEL ULTRASONIC POWER MEASUREMENTS

FIELD OF THE INVENTION

This invention relates to sonic energy measuring apparatus and techniques, and more particularly to a portable apparatus for measuring the ultrasonic energy radiated by a diagnostic ultrasound device to determine the total radiated ultrasonic power output thereof.

BACKGROUND OF THE INVENTION

A high percentage of hospitals and similar institutions utilize ultrasonic diagnostic equipment. There is a substantial need by such institutions, as well as by manufacturers of such ultrasonic equipment and by research organizations in this field, for a compact and portable apparatus for measuring the radiated power output of diagnostic and other ultrasonic equipment in a reliable and safe manner. Prior to the development of the device of the present invention there were no conveniently portable devices available capable of measuring the total time-averaged power output of diagnostic ultrasound units. Laboratory thermal measurement devices were available, but these were not of the parabolic focussing type and therefore had low sensitivity and relatively slow response.

SUMMARY OF THE INVENTION

The technique employed in connection with the present invention is to utilize a parabolic reflector to focus ultrasonic energy from the transducer device under test onto a thermally-responsive electrical sensing element and to determine the total radiated ultrasonic power from the state of the sensing element after a reasonably short response time, of the order of 150 seconds, noted by the off-balance voltage of a Wheatstone bridge.

Accordingly, a main object of the present invention is to provide a method and apparatus for determining the time-averaged power output of diagnostic ultrasonic units which overcomes the deficiencies and disadvantages of previously employed power measuring techniques and apparatus for this purpose.

A further object of the invention is to provide a novel and improved method and apparatus for measuring the power output of diagnostic ultrasound units which involves the utilization of relatively simple procedural steps, which employs compact and relatively portable equipment, which has high sensitivity, and which achieves a rapid response.

A still further object of the invention is to provide an improved portable device capable of measuring the total time-averaged power output of diagnostic ultrasound units, employing parabolic focussing onto a sensing element and achieving a rapid, sensitive response.

A still further object of the invention is to provide an improved ultrasonic power output measuring apparatus as above described which is immersed in a liquid medium and which is compensated for variations in temperature of the liquid medium during the measurement periods.

BRIEF DESCRIPTION OF THE DRAWING

Further objects and advantages of the invention will become apparent from the following description and claims, and from the accompanying drawing wherein the single FIGURE is a diagrammatic vertical cross-sectional view of a typical ultrasonic energy output measuring device according to the present invention, shown with its electrical connections and with a transducer mounted thereon in position for measuring its total time-averaged power output.

DESCRIPTION OF A PREFERRED EMBODIMENT

Referring to the drawing, a sonic energy measuring apparatus 11, according to the present invention, is arranged for measuring the radiated ultrasonic power output from an ultrasonic transducer 12, which may comprise the output transducer of a diagnostic ultrasound device. The apparatus 11 comprises a rigid plastic container 13 filled with water 14 and having a top cover 15 provided with a suitable holder ring, diagrammatically shown at 16, in which the transducer 12 to be tested is secured. The holder member 16 may comprise a holder of the double iris diaphragm type. The holder 16 is arranged to insure that the ultrasonic beam from transducer 12 will be centered and directed downwardly, as viewed in the drawing.

Rigidly secured in the container 13 in axial alignment with the transducer 12 is a parabolic reflector 17. The reflector 17 is a paraboloid of revolution ($y^2 = 0.4x$) and is constructed of suitable relatively rigid material, such as 0.64 mm thick nickel. In a typical design, the outer opening 18, defining the ultrasonic entrance port, was 19 mm in diameter, and the distance from the apex of the paraboloid to the opening 18 was 229 mm. Theoretically a parabola will focus parallel rays incident along its axis of symmetry through its focal point. However, in the typical design according to the present invention the exit port of the reflector 17, shown at 19, was cut above the focal plane, 6.4 mm from the apex. This was done for the purpose of somewhat diffusing the focussing, to match the opening area 19 to that of the sensor, shown at 20 (both about 10 sq. mm in the typical design) and to insure that sound reflected near the exit port 19 emerges very nearly normal (about 76°) to the surface of the sensing element 20, located about 3 mm below and parallel to the plane of said exit port.

The sensor 20 comprises a thin film thermistor chip (such as a "thinistor", like Model FN3C2, made by Victory Engineering Corp.). The semiconductor material in this unit is about 0.005 mm thick and is mounted on a 0.025 mm thick square of nickel foil. In plan, its dimensions are 3.2 mm by 3.2 mm. The resistance of the "thinistor" is approximately 4000 ohms at 25° C.

The sensor unit 20 is mounted on a sound-absorbing plate 21 of e.g. rubber (similar to SOAB, made by B. F. Goodrich Co., Inc.) with an absorption cooefficient of aproximately 10 dB at 1 MHz. A urethane varnish, or other suitable adhesive material, is employed to bond the chip unit 20 to the rubber plate 21. Said rubber plate 21 is in turn suitably secured on a rigid horizontal support plate 22 mounted on vertical post elements 23 rigidly secured to the bottom wall 24 of container 13.

A reference sensor unit 25, similar to unit 20, is secured on rubber plate 21 adjacent to the insonated chip unit 20 but outside the ultrasonic beam.

Insonated sensor unit 20 is connected to a Wheatstone bridge 26 so as to define one leg thereof. Reference unit 25 is connected to bridge 26 so as to define an opposite leg thereof. The remaining legs of the bridge 26 may have resistance values as shown and are provided respectively with the potentiometer 27 and the adjustable resistor 28 for setting a null condition. A suitable power supply, such as a battery 29, is connected to energize the bridge 26 through the sliding contact of potentiometer 27 and the ground connection leads 30 and 31, as shown. Connected across the output terminals 32 and 33 of the bridge is a suitable voltage indicator 34, which may comprise a digital multimeter, used to monitor output voltage.

In operation, with bridge 36 initially set to a null condition before insonation, the transducer 12 is energized. When the ultrasonic energy is absorbed by the sensor 20 and surrounding media, the ensuing rise of temperature causes a change of the thermistor resistance. In the typical design above mentioned the sensor coefficient of resistance is 4.4% per degree C. at 25° C. The reference sensor 25, with a similar performance characteristic, compensates for variations of water temperature during the measurement period and thus minimizes spurious voltage output which would be otherwise caused by such water temperature variations.

The compensated change of resistance of the sensor unit 20 is measured by the bridge circuit 26 and provides a voltage reading on the indicator 34. After a relatively short response time, such as 150 seconds after energizing the transducer 12, the off-balance voltage shown by the indicator 34 will provide a measure of the average acoustic power delivered by the transducer.

All of the bridge elements, with the exception of the thermistors, may be contained in a single control box. These include the voltage supply, which may comprise the battery 29 or any other suitable, preferably variable, voltage supply and the adjustable-resistance potentiometers used to null the bridge output prior to insonation.

Summarizing, the response time of the instrument is about 150 seconds, and about 300 seconds is required for one complete measurement cycle. To perform an ultrasonic power determination, the transducer to be tested is mounted in the holder 16 and the variable bridge elements are adjusted to null the bridge output. The transducer is then energized and the off-balance voltage of indicator 34 is noted 150 seconds after energizing the transducer.

While a specific embodiment of an improved apparatus for measuring the radiated power output of an ultrasonic device has been disclosed in the foregoing descriptions, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. An acoustic transducer testing apparatus comprising a vessel containing a sound-transmitting liquid, means to support a transducer on the vessel in a position in the liquid to direct sound energy therefrom into the vessel and through the liquid, stationary sensor support means in the vessel located in the path of the sound energy, temperature-responsive impedance means on said sensor support means, impedance-responsive electrical indicator circuit means connected to said temperature-responsive impedance means to show a temperature change of said impedance means responsive to emission of sound energy from said transducer, and a rigid parabolic reflector focussing means mounted within the liquid in said vessel in the sound transmission path between said transducer supporting means and said temperature-responsive impedance means and positioned substantially to focus the sound energy onto said impedance means, said parabolic reflector focussing means terminating short of its focal area and having an opening at the area of termination through which the sound energy passes to said temperature-responsive impedance means.

2. The transducer testing apparatus of claim 1, and wherein said parabolic reflector focussing means comprises a paraboloid of revolution arranged with its axis aligned with said transducer supporting means and said impedance means, and said impedance means has a surface area facing the opening in said parbolic reflector approximately equal to said opening.

3. The transducer testing apparatus of claim 2, and second temperature-responsive impedance means mounted in said vessel away from the focussing means and connected to said circuit means so as to compensate for temperature changes of the liquid.

4. The transducer testing apparatus of claim 2, and a layer of resiliently deformable sound absorbing material underlying said temperature-responsive impedance means.

5. The transducer testing apparatus of claim 1, and wherein said temperature-responsive impedance means is in the form of a flat thermistor chip of extended area and is located substantially normal to the axis of said parabolic reflector focussing means.

6. An acoustic transducer testing apparatus comprising a vessel containing sound-transmitting liquid, means to support a transducer on the vessel in a position to direct sound energy therefrom into the vessel and through the liquid, stationary sensor support means in the vessel located in the path of the sound energy, temperature-responsive impedance means on said sensor support means, said temperature-responsive impedance means being in the form of a flat thermistor chip of extended area, impedance-responsive electrical indicator circuit means connected to said temperature-responsive impedance means to show a temperature change of said impedance means responsive to emission of sound energy from said transducer, and parabolic reflector focussing means in said vessel in the sound transmission path between said transducer supporting means and said temperature-responsive impedance means and positioned substantially to focus the sound energy onto said impedance means, said flat thermistor chip of extended area being located substantially normal to the axis of said parabolic reflector focussing means, wherein said parabolic reflector focussing means has an exit aperture substantially coextensive in area with said flat chip, and wherein said flat chip is spaced inwardly a short distance along said axis from the focal point of said parabolic reflector focussing means.

7. The transducer testing apparatus of claim 6, and wherein said electrical indicator circuit means comprises a Wheatstone bridge with said temperature-responsive impedance means connected in one leg of the bridge.

8. The transducer testing apparatus of claim 7, and second temperature-responsive impedance means mounted in said vessel away from said focussing means and connected in an opposite leg of the bridge so as to compensate for temperature changes of the liquid.

9. An acoustic transducer testing apparatus comprising a vessel containing sound-transmitting liquid, means to support a transducer on the vessel in a position to direct sound energy therefrom into the vessel and through the liquid, stationary sensor support means in the vessel located in the path of the sound energy, temperature-responsive impedance means on said sensor support means, said temperature-responsive impedance means being in the form of a flat thermistor chip of extended area, impedance-responsive electrical indicator circuit means connected to said temperature-responsive impedance means to show a temperature change of said impedance means responsive to emission of sound energy from said transducer, and parabolic reflector focussing means in said vessel in the sound transmission path between said transducer supporting means and said temperature-responsive impedance means and positioned substantially to focus the sound energy onto said impedance means, said flat thermistor chip of extended area being located substantially normal to the axis of said parabolic reflector focussing means and said parabolic reflector focussing means having an exit aperture substantially coextensive in area with said flat chip.

10. An acoustic transducer testing apparatus comprising a vessel containing sound-transmitting liquid, means to support a transducer on the vessel in a position to direct sound energy therefrom into the vessel and through the liquid, stationary sensor support means in the vessel located in the path of the sound energy, temperature-responsive impedance means on said sensor support means, said temperature-responsive impedance means being in the form of a flat thermistor chip of extended area, impedance-responsive electrical indicator circuit means connected to said temperature-responsive impedance means to show a temperature change of said impedance means responsive to emission of sound energy from said transducer, and parabolic reflector focussing means in said vessel in the sound transmission path between said transducer supporting means and said temperature-responsive impedance means and positioned substantially to focus the sound energy onto said impedance means, said flat chip being located substantially normal to the axis of said parabolic reflector focussing means and being spaced inwardly a short distance along said axis from the focal point of said parabolic reflector focussing means.

11. A device in accordance with claim 1, wherein said parabolic reflector comprises nickel.

* * * * *